(12) United States Patent
Fujisawa

(10) Patent No.: US 12,065,312 B2
(45) Date of Patent: Aug. 20, 2024

(54) PICKING ASSISTANCE SYSTEM AND PROGRAM

(71) Applicant: Kazunori Fujisawa, Tokyo (JP)

(72) Inventor: Kazunori Fujisawa, Tokyo (JP)

( * ) Notice: Subject to any disclaimer, the term of this patent is extended or adjusted under 35 U.S.C. 154(b) by 0 days.

(21) Appl. No.: 18/002,481

(22) PCT Filed: Jun. 23, 2021

(86) PCT No.: PCT/JP2021/023815
§ 371 (c)(1),
(2) Date: Dec. 19, 2022

(87) PCT Pub. No.: WO2021/261527
PCT Pub. Date: Dec. 30, 2021

(65) Prior Publication Data
US 2023/0192405 A1 Jun. 22, 2023

(30) Foreign Application Priority Data
Jun. 25, 2020 (JP) ................................ 2020-109819

(51) Int. Cl.
*G06F 7/00* (2006.01)
*B65G 1/137* (2006.01)
(52) U.S. Cl.
CPC ................................ *B65G 1/1373* (2013.01)
(58) Field of Classification Search
CPC ................................................... B65G 1/1373
(Continued)

(56) References Cited

U.S. PATENT DOCUMENTS 9,067,317 B1    6/2015  Wurman et al.
2019/0127146 A1*  5/2019  Yoshimoto ............. G06Q 10/08
2019/0302787 A1* 10/2019  Li ...................... G06Q 10/0832

FOREIGN PATENT DOCUMENTS

CN       109703969 A     5/2019
JP       2010-514646 A   5/2010
(Continued)

OTHER PUBLICATIONS

The extended European search report of the corresponding EP application No. 21829985.7 mailed Dec. 14, 2023.
(Continued)

*Primary Examiner* — Yolanda R Cumbess
(74) *Attorney, Agent, or Firm* — Muncy, Geissler, Olds & Lowe, P.C.

(57) ABSTRACT

A picking assistance system for assisting in picking from storage racks storing a necessary item, by moving the storage racks to another location. In the storage area, the storage racks are disposed in longitudinal and lateral directions; the system includes a control device for moving the storage racks; and the control device performs control in a manner that vacant row(s) is/are formed in the longitudinal or lateral direction by movement of the storage racks, and further performs control in a manner to, when a necessary storage rack is moved from a row adjacent to one of the vacant rows to the other location, make a storage rack currently necessary remain in the adjacent row by moving an unnecessary storage rack in the adjacent row to the vacant row, and move all of storage racks currently necessary, the storage racks remaining in the adjacent row, in one group to the other location is provided.

16 Claims, 15 Drawing Sheets

(58) Field of Classification Search
USPC .................................. 701/5; 700/213–216
See application file for complete search history.

(56) References Cited

FOREIGN PATENT DOCUMENTS

| JP | 2016-508474 A | 3/2016 |
| JP | 2018-199562 A | 12/2018 |
| JP | 2019-077549 A | 5/2019 |
| JP | 2020-001868 A | 1/2020 |
| JP | 6736788 B1 | 8/2020 |
| WO | 2017/187539 A1 | 11/2017 |

OTHER PUBLICATIONS

Office Action of the corresponding CN application No. 202180045341.9 mailed Aug. 17, 2023.

* cited by examiner vacant  vacant
grid    row
cells

PICKING ASSISTANCE SYSTEM AND PROGRAM

TECHNICAL FIELD

The present invention generally relates to a picking assistance system in a logistics hub such as a warehouse or a manufacturing hub such as a plant. More specifically relates, the present invention relates to a system that assists picking items or parts stored in a hub as designated by a control device.

BACKGROUND ART

In recent years, picking assistance systems arranged to automatically transport a rack that stores items or parts to a worker (the worker is not limited to a human being but may be a robot arm) via an automatic transport vehicle and allow the worker to retrieve the items or the parts from a rack in a hub have been operated and further various ideas have been proposed.

For example, a method for fulfilling inventory requests, the method including a step of receiving an inventory request requesting an inventory item and a step of selecting the requested inventory item from an inventory holder, and further including a step of storing the requested inventory item in an order holder associated with the inventory request and moving the order holder to a storage space, is proposed (Patent Literature 1).

More specifically, Patent Literature 1 discloses a method for fulfilling inventory requests, the method including a step of receiving an inventory request requesting an inventory item, a step of selecting the requested inventory item from an inventory holder, a step of storing the requested inventory item in an order holder associated with the inventory request, a step of moving the order holder to a storage space, a step of detecting a trigger event and a step of, in response to the step of detecting the trigger event, retrieving the order holder from the storage space.

Also, a picking assistance system configured to enable enhancement in work efficiency is proposed (Patent Literature 2).

In other words, Patent Literature 2 discloses a picking assistance system for supporting picking work, the picking assistance system including a plurality of racks that are movable and capable of storing at least one item and a control device that controls movement of each of the racks, in which the control device makes a predetermined processing sequence of moving a sorting rack selected from the racks to a workspace selected from a plurality of workspaces and moving an item from a storage rack disposed in the selected workspace to the sorting rack via picking work be repeatedly performed with the workspace changed from one to another until the sorting rack stores predetermined items.

Also, a technique that enhances item storage efficiency via an increase in area of a site in which storage racks for items can be disposed is proposed (Patent Literature 3).

In other words, Patent Literature 3 discloses an operation management system in which layout information including information of a position of each storage rack, a direction of each storage rack and a position of a transport vehicle is held, based on the layout information, if a direction of a movement-target storage rack at a current location and a direction expected at a destination do not agree with each other, a rotation direction and a rotation angle for changing the direction of the movement-target storage rack from the direction at the current location to the direction expected at the destination are determined, a pathway of movement from the current location to the destination is searched for in such a manner that at least one grid that allows rotation, around which there is no obstacle that hinders rotation of the storage rack, and a transport vehicle is controlled in such a manner as to transport the movement-target storage rack from the current location to the destination through the path searched for and rotate by the determined rotation angle in the determined rotation direction in the grid that allows rotation.

CITATION LIST

Patent Literature

Patent Literature 1: Japanese Translation of PCT International Application Publication No. 2010-514646
Patent Literature 2: Japanese Patent Laid-Open No. 2020-001868
Patent Literature 3: Japanese Patent Laid-Open No. 2018-199562

SUMMARY OF INVENTION

Technical Problem

However, even in view of the above conventional techniques, there are still expectations for further improvement of systems that enable cost reduction via reduction of passages in a work area and enable efficiently moving related items.

Solution to Problem

Therefore, a picking assistance system according to an embodiment of the present invention is a picking assistance system for assisting in picking from one or more storage racks that store a necessary item, by moving the storage racks that store a necessary item from among a plurality of storage racks stored in a storage area to another location, wherein: in the storage area, the plurality of storage racks are disposed in longitudinal and lateral directions; the system includes a control device for moving the storage racks; and the control device performs control processes in such a manner that one or more vacant rows are formed in the longitudinal or lateral direction by movement of the storage racks, and further performs control processes in such a manner to, when a necessary storage rack is moved from a row adjacent to one of the vacant rows to the other location, make a storage rack that is currently necessary remain in the adjacent row by moving an unnecessary storage rack in the adjacent row to the vacant row, and move all of storage racks that are currently necessary, the storage racks remaining in the adjacent row, in one group to the other location. The necessary storage rack is a storage rack that includes at least one necessary item to fulfill an order.

Also, when moving necessary storage racks from a row adjacent to one of the vacant rows to the other location, the storage racks to be moved to the vacant row in the adjacent row are necessary storage racks or unnecessary storage racks the number of which is less.

Advantageous Effects of Invention

A picking assistance system according to an embodiment of the present invention provides advantageous effects including reducing the number of passages in a work area, and efficiently moving related items thereby reducing costs.

DESCRIPTION OF EMBODIMENTS

Figure 1:
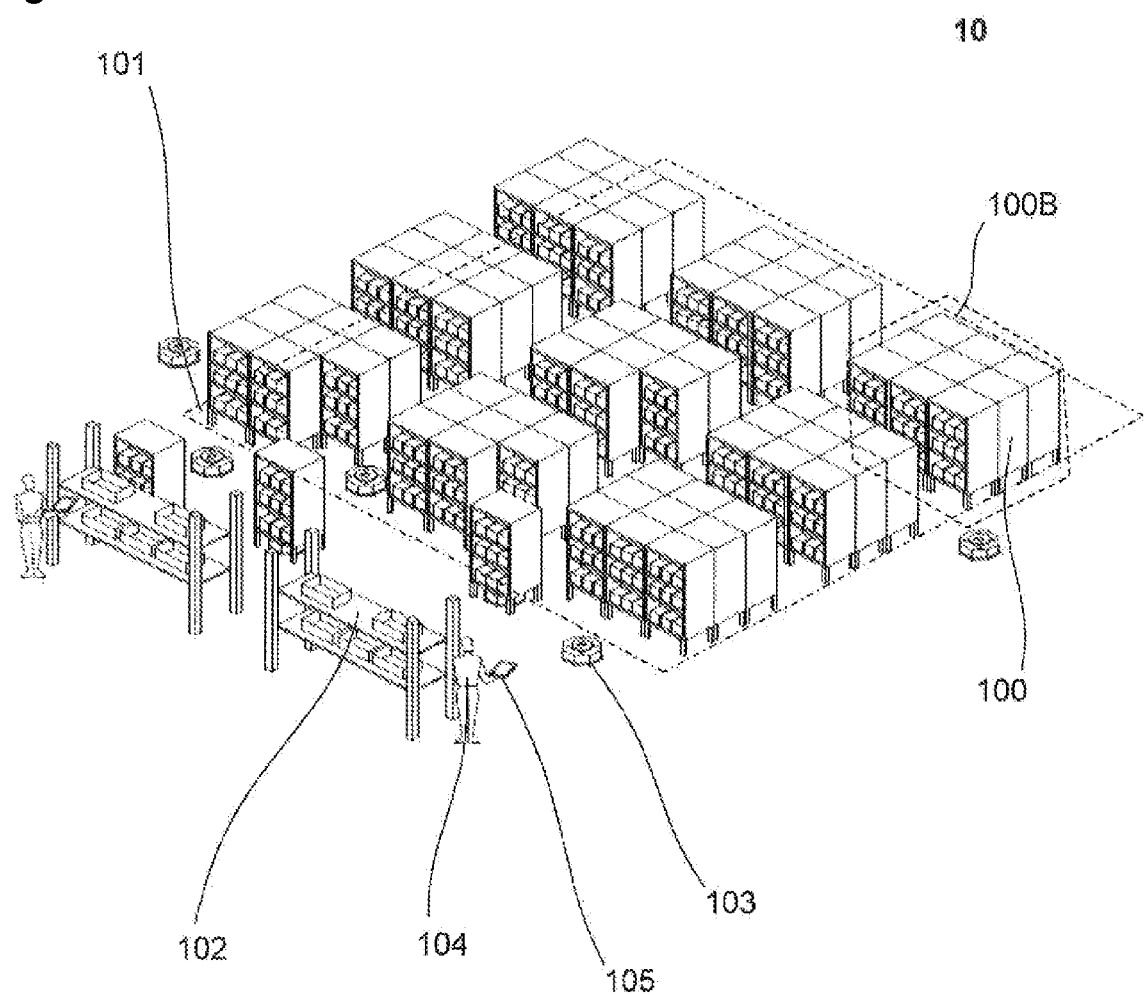
FIG. 1 is a diagram illustrating an appearance of a logistics facility (or a plant facility) to which a picking assistance system according to an embodiment of the present invention has been introduced.

A picking assistance system according to an embodiment of the present invention will be described in detail below with reference to the drawing.

FIG. 1 schematically illustrates an appearance of a logistics facility or a plant facility to which a picking assistance system according to an embodiment of the present invention has been introduced. Typical examples of the logistics facility or the plant facility include a logistics facility for shipping commodities and a plant facility for assembling products. In the following, for simplicity of description, the description will be given mainly taking a logistics facility as an example.

A characteristic of a facility to which a picking assistance system according to an embodiment of the present invention has been introduced lies in that the facility is configured such that a multitude of storage racks are orderly stored inside and necessary storage racks are individually transported to a work area in order for workers (which do not necessarily need to be human beings but robots may work. Hereinafter, they are referred to as "workers") to perform sorting or packing. Necessary storage rack are storage racks that include at least one necessary item to fulfill an order.

In FIG. 1, a facility 10 mainly includes a storage area 101 in which a plurality of storage racks 100 are disposed in an array, and a work area 102 for workers 104 to sort or pack necessary commodities or parts in sorting boxes, package boxes. In an embodiment, the storage racks 100 are disposed with almost no space among the storage racks 100, and as an example, blocks such as a block 100B are formed (in the figure, other blocks can be seen). Passages that allow storage racks to pass through are formed among the blocks, and minimization of the passages enables an increase in number of storage racks that can be stored in the area 101 and thus enables reduction in management cost.

In an embodiment, in the work area 102, the workers 104 each carrying a worker terminal 105 sort or pack necessary commodities or parts from storage racks transported to the work area 102. The storage racks are transported from the storage area 101 by automatic transport robots 103. Here, which storage racks are necessary for the workers are managed by a non-illustrated management server, and the management server provides necessary instructions for transport, to the automatic transport robots 103. Also, the management server provides instructions regarding which commodities or parts in the storage racks transported to the work area should be sorted or packed, to the workers via the respective worker terminals 105.

In another embodiment, where the workers are robots (not illustrated in FIG. 1), the worker terminals 105 are omitted and the management server can provide instructions directly to the robots.

[Sales Management]

Also, a picking assistance system according to an embodiment of the present invention can perform sales management of commodities as necessary, which is, however, not necessarily essential. A picking assistance system according to an embodiment of the present invention can be linked with a non-illustrated mail order (electronic commerce) system or shop POS register, enabling customer-by-customer management of sales performance via mail orders and sales performance in shops. In an embodiment, the following databases (D1) to (D4) are included in a management server for providing information or updating requests from various terminals as necessary.

(D1) Customer Management Database

A customer management database is a database in which entries relating to customers are registered, and personal information such as names, addresses, phone numbers, etc., of the customers and supplementary information such as held points and nearest hubs are registered in the database.

(D2) Commodity Management Database

A commodity management database is a database in which entries relating to commodities are registered, and commodity names and commodity codes associated with JAN codes are registered and managed in the database.

(D3) Inventory Management Database

An inventory management database is a database for managing a commodity inventory in each logistics hub, from which a necessary table is derived and extracted through linkage with the commodity management database as appropriate.

(D4) Sales Management Database

A sales management database is an actual performance management database relating to commodities sold in each logistics hub or shop.

Figure 2:
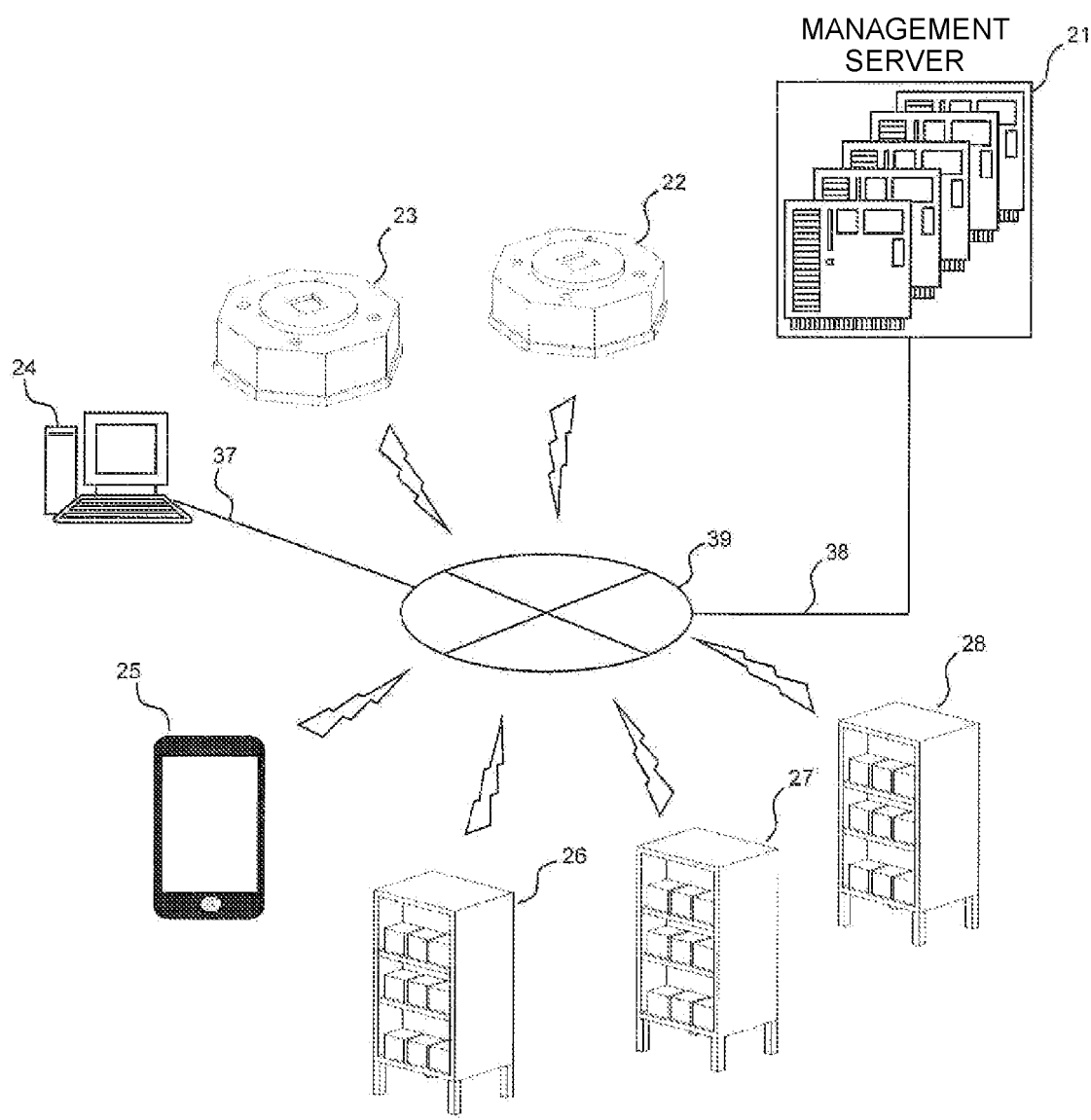
FIG. 2 is a diagram illustrating an example overall configuration of a picking assistance system according to an embodiment of the present invention.

FIG. 2 illustrates an example overall configuration of a picking assistance system according to an embodiment of the present invention.

As illustrated in FIG. 2, a picking assistance system 20 includes, as a general configuration in an embodiment thereof, a management server 21, automatic transport robots 22 and 23 that transport storage racks, various information processing devices (a PC 24 and a mobile information terminal, a tablet terminal or a POS terminal 25 are illustrated as examples in the figure. Hereinafter, these devices may be collectively referred to as "worker terminals" or simply as "terminals") that workers use, and storage racks 26 to 28. In an embodiment, the management server 21 and various terminals are connected in a mutually communicable manner via dedicated channels or public channels such as the Internet (37 and 38 as wired channels) as illustrated in FIG. 2.

Also, the channels may be wired or wireless ones, and where the channels are wireless ones, various terminals 24 and 25 and the storage racks 26 to 28 wirelessly access the Internet 39 via a non-illustrated base station or access point, and further connected to the management server 21 via the channel 38 in a mutually communicable manner.

Here, an access point refers to a radio for mutually connecting wireless terminals such as PCs or smartphones or connecting such wireless terminals to another network. Typically, an access point is a device that operates according to communication protocols of Layer 1 (physical layer) and Layer 2 (data link layer) in the OSI reference model.

Note that the automatic transport robots 22 and 23 and the storage racks 26 to 28 do not necessarily need to communicate with the management server 21 via the Internet 39 and may be connected to the management server 21 via wireless communication inside a facility.

Also, many of mobile information terminals and tablets at the time of filing of the present application have processing capabilities (a communication processing speed and image processing capability) that are equal to or higher than those of personal computers (PC) and are ones that should be regarded as small, high-performance computers.

Furthermore, a program or software necessary for carrying out the present invention is normally installed or stored in an HDD or an SSD in a storage section of a PC or a mobile information terminal, and at the time of execution of the program or the software, an entirety or a part of the program or the software is read onto a memory in the storage section as necessary as a software module and arithmetic operation is performed in a CPU.

Alternatively, a browser-based computer or a mobile information terminal may be employed. In this case, a program is distributed from another server or computer to the terminal as necessary and the program is executed in the browser on the terminal.

Also, for a hardware configuration of the management server 21, basically, a PC can be employed (which will be described later with reference to FIG. 3A just for confirmation). Note that the management server 21 can employ a configuration suitable for large-scale data processing by making a plurality of PCs (several tens to several tens of thousands of PCs as an example) operate in parallel, in order to improve hardware specifications of the management server 21 as necessary; however, the present invention is not limited to this example.

In FIG. 2, the storage racks 26 to 28 are disclosed as being configured to be mutually communicable with the management server 21, and in this case, the storage racks 26 to 28 may each be configured to selectively transmit information such as a position and a direction of the storage rack itself, and the presence and types of the stored items to the management server 21. However, this configuration is not essential to the present invention and a configuration in which the storage racks 26 to 28 have no communication function can be employed.

Figure 3A:
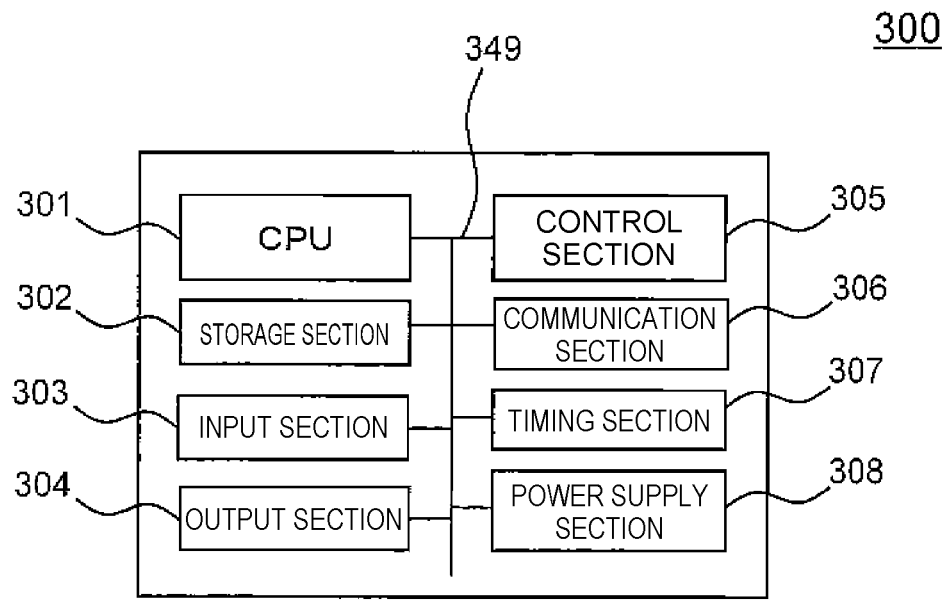
FIG. 3A is a diagram illustrating a functional block configuration of a management server in a picking assistance system according to an embodiment of the present invention.

FIG. 3A is a functional block diagram of a management server in a picking assistance system according to an embodiment of the present invention. For illustrative purposes, operation of the management server is enabled by operation of each of hardware pieces described below and linked operation of software and these hardware pieces.

In FIG. 3A, a management server 300, which is an entirety of hardware blocks, mainly includes a CPU 301 for performing various types of comparison/arithmetic processing, a storage section 302 including a RAM, a ROM and/or a flash memory, an input section 303 including a keyboard and/or a pointing device, an output section 304 including a display and/or a speaker, a control section 305 for controlling various types of signals, a communication (interface) section 306 (whether wireless or wired), a timing section 307 for measuring a time, and a power supply section 312.

These modules are appropriately connected via a communication bus or power feeder wires (in FIG. 3A, for sake of simplicity, respective wires are collectively illustrated as an appropriately divided wire connection 349) as necessary.

Also, a program or software necessary for carrying out the present invention, which is executed on the management server 300, is normally installed or stored in a hard disk drive, an SSD (solid-state drive) or a flash memory included in the storage section 302, and at the time of execution of the program or the software, an entirety or a part of the program or the software is read onto a memory in the storage section 302 as necessary as a software module and arithmetic operation is performed in the CPU 301.

Not that the arithmetic operation does not necessarily need to be performed in a central processing section such as the CPU 301 and can be performed using an auxiliary arithmetic device such as a non-illustrated digital signal processor (DSP).

Figure 3B:
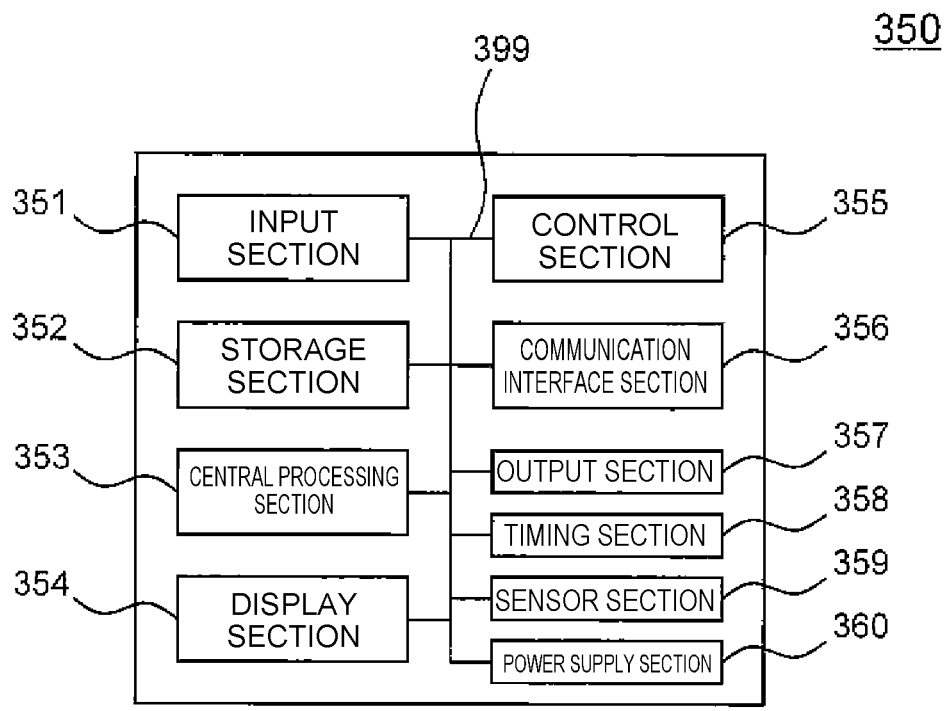
FIG. 3B is a diagram illustrating a functional block configuration of a tablet terminal in a picking assistance system according to an embodiment of the present invention.

FIG. 3B is a functional block diagram of hardware pieces configuring a tablet terminal 25, which serves as a worker terminal according to an embodiment of the present invention. Operation of the tablet terminal 25 is enabled by operation of each of hardware pieces described below and linked operation of software and these hardware pieces.

In FIG. 3B, a tablet terminal 350, which is an entirety of hardware blocks, mainly includes an input section 351 including a hardware button, a multi-touch input panel provided on a display and a microphone, a storage section 352 including a hard disk, a RAM and/or a ROM for storing programs and data, a central processing section 353 including a CPU that performs various numerical calculations and logical operations according to a program, a display section 354 including a display, a control section 355 for controlling a chip, an electrical system, etc., a communication interface section 356 including a slot for access to the Internet, a port for performing optical communication and a communication interface, an output section 357 including a speaker, a vibrator and/or an infrared projector, a timing section 358 for measuring a time, a sensor section 359 including an image sensor such as CMOS, an infrared sensor and/or an inertial sensor, and a power supply section 360 for supplying power to the respective modules in the device, and these modules are appropriately connected via a communication bus or power feeder wires (in FIG. 3B, for sake of simplicity, the wires are collectively shown as an appropriately divided wire connection 399) as necessary.

Note that the sensor section 359 may include a GPS sensor module for identifying a position of the tablet terminal 350 (25). Also, signals detected by the image sensor such as CMOS and/or the infrared sensor included in the sensor section 359 can be processed as input information in the input section 351.

Also, a program or software necessary for carrying out the present invention, which is executed on the tablet terminal 350, is normally installed or stored in a hard disk drive, an SSD (solid-state drive) or a flash memory included in the storage section 352, and at the time of execution of the program or the software, an entirety or a part of the program or the software is read onto a memory in the storage section 352 as necessary as a software module, and arithmetic operation is performed in the CPU 353.

Note that the arithmetic operation does not necessarily need to be performed in the central processing section 353 such as the CPU and can be performed using an auxiliary arithmetic device such as a non-illustrated digital signal processor (DSP).

Figure 4:
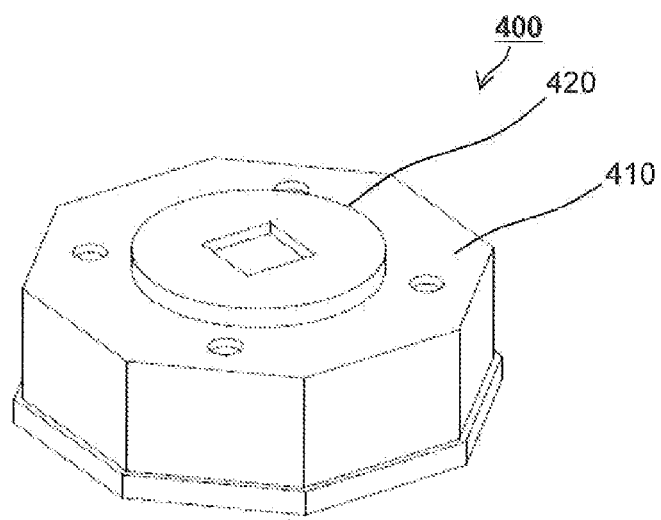
FIG. 4 is a diagram illustrating example outer appearance configurations of an automatic transport robot and a storage rack in a picking assistance system according to an embodiment of the present invention.
Figure 4:
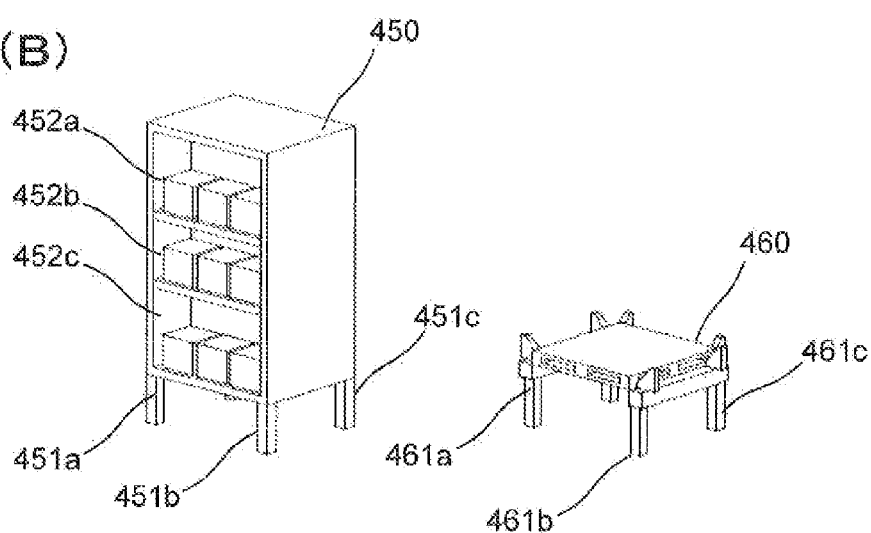

FIG. 4 illustrates outer appearance configurations of an automatic transport robot (A) and a storage rack (B) in a picking assistance system according to an embodiment of the present invention. In FIG. 4(A), an automatic transport robot 400 includes a non-illustrated pair of wheels at a bottom portion of a body 410, and moves on a floor surface inside a facility via motor driving. In an embodiment, the wheels can separately rotate normally and reversely, and for example, when the wheels rotate in a same direction, the automatic transport robot go straight forward or backward, and when the wheels are rotated in respective directions opposite to each other, the automatic transport robot turns. The automatic transport robot is self-driven by a computer. Also, in order to stabilize driving of the automatic transport robot, non-illustrated castors may be provided in addition to the pair of wheels.

In an embodiment, a height of the automatic transport robot 400 is around 15 to 30 cm, and a liftable rack support portion 420 is provided at a top of the automatic transport robot 400. The automatic transport robot 400 can enter lower space formed by leg portions of a storage rack such as one illustrated in FIG. 4(B). The automatic transport robot 400 can lift up a storage rack located on an upper portion thereof by raising the rack support portion 420 at the lower space of the storage rack, and furthermore, can move with the storage rack lifted up. Consequently, the storage rack can freely be moved inside the facility. Upon the storage rack lifted up by the automatic transport robot being moved to a target location, the rack support portion is lowered and the storage rack is placed at the location. The automatic transport robot can further move to another location to transport another storage rack.

FIG. 4(B) illustrates an exemplary storage rack. A storage rack 450 includes four leg portions 451a to 451d (451d is not illustrated in the figure) that are slightly higher than the height of the automatic transport robot, and includes three shelf portions 452a to 452c above the leg portions 451a to 451d. In each shelf portion, commodities or parts are stored, and an identification number (an ID) of the rack, an identification number of commodities or parts (a JAN code in the case of commodities) currently stored in the rack are updated as occasion arises and managed in a management server. In an embodiment, the automatic transport robot enters the space part formed by the four leg portions 451a to 451d, in response to an instruction from the management server and moves the rack 450 to another location.

As with the storage rack 450, a storage rack 460 includes four leg portions 461a to 461d (461d is not shown in the figure) that are slightly higher than the height of the automatic transport robot, and as illustrated in FIG. 4(B), includes a mount on which commodities or parts can be mounted, above the leg portions 461a to 461d. In this case, it can be understood that there is a lot of flexibility in shape, etc., of commodities or parts that can be mounted on the mount in comparison with those that can be stored in the storage rack 450. In an embodiment, the automatic transport robot enters a space part formed by the four leg portions 461a to 461d, in response to an instruction from the management server and moves the rack 460 to another location.

Figure 5:
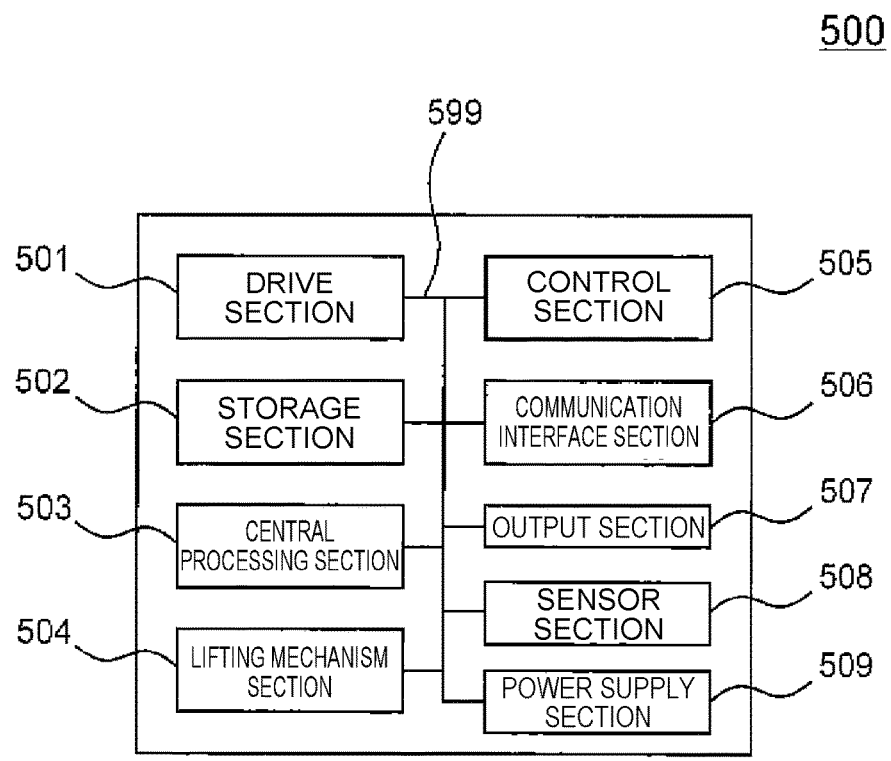
FIG. 5 is a diagram illustrating a functional block configuration of hardware configurating an automatic transport robot according to an embodiment of the present invention.

FIG. 5 illustrates a functional block configuration of hardware configuring an automatic transport robot according to an embodiment of the present invention. In FIG. 5, an automatic transport robot 500, which is an entirety of hardware blocks, mainly includes a drive section 501 such as a motor for driving wheels, a storage section 502 including a hard disk, a RAM and/or a ROM for storing programs and data, a central processing section 503 including a CPU that performs various numerical calculations and logical operations according to a program, a lifting mechanism section 504 that lifts a rack up and down, a control section 505 for controlling a chip and/or an electrical system, a communication interface section 506 including a slot for access to a network, a port for performing near-field wireless communication and a communication interface, an output section 507 including a speaker, a sensor section 508 including an image sensor such as CMOS, an infrared sensor and/or an inertial sensor, and a power supply section 509 for supplying power to the respective modules in the device, and these modules are appropriately connected via a communication bus or power feeder wires (in FIG. 5, for sake of simplicity, the wires are collectively shown as an appropriately divided wire connection 599) as necessary.

Note that in an embodiment, the sensor section 509 may include a GPS sensor module for identifying a position of the automatic transport robot 500 (22 and 23). Also, signals detected by the image sensor such as CMOS and/or the infrared sensor included in the sensor section 509 can be processed as input information in a non-illustrated input section.

Also, a program or software necessary for carrying out the present invention, which is executed on the automatic transport robot 500, is normally installed or stored in a hard disk drive, an SSD (solid-state drive) or a flash memory included in the storage section 502, and at the time of execution of the program or the software, an entirety or a part of the program or the software is read onto a memory in the storage section 502 as necessary as a software module, and arithmetic operation is performed in the CPU 503.

Figure 6A:
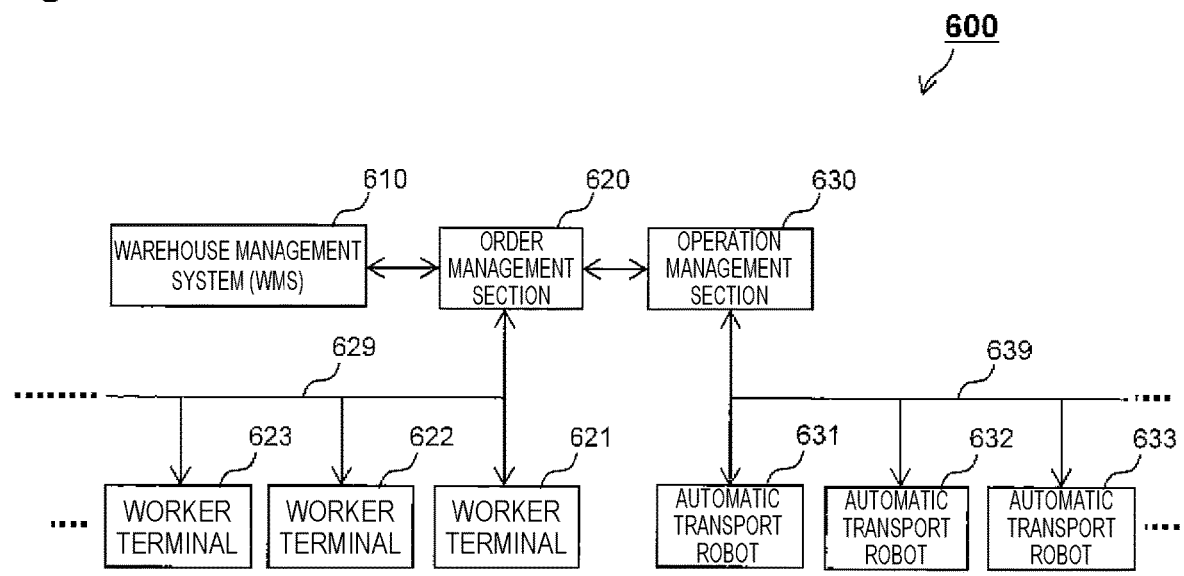
FIG. 6A is a diagram illustrating an example configuration of a picking assistance system according to an embodiment of the present invention.

FIG. 6A illustrates example configurations of a picking assistance system according to an embodiment of the present invention. In FIG. 6A, a system 600 includes a warehouse management system (WMS) 610, an order management section 620 and an operation management section 630 that can be communicably connected to one another, one or more worker terminals 621 to 623 connected to the order management section 620 via a network 629, and a plurality of automatic transport robots 631 to 633 connected to the operation management section 630 by a network 639.

The warehouse management system (WMS) 610, the order management section 620 and the operation management section 630 are ones resulting from the management server 21 in FIG. 2 being sectioned in terms of function in an embodiment. Also, each of the networks 629 and 639 may be wired or wireless. The number of worker terminals 621 to 623 and the number of automatic transport robots 631 to 633 are not limited.

In an embodiment, the warehouse management system 610 controls the order management section 620. For example, the warehouse management system 610 transmits order information and storage rack data to the order management section 620. Here, an order including information such as a name and/or identification information of an item that should be sorted or packed for the order, the number of such items and a shipping address. Also, storage rack data includes data that identifies a storage rack that the items in the warehouse are stored on. In an embodiment, the order management section 620 gives an instruction regarding the racks storing necessary items that should be moved to the operation management section 630. More specifically, the order management section 620 provides a list of storage racks that include items in an order that should be sorted or packed to the operation management section 630. The order management system 620 may further gives more specific instruction regarding which storage racks storing necessary items should be moved to the work area. The storage racks storing necessary items for an order are then moved to the work area based on the instruction and work is performed to fill the order. Upon receiving a notification from the operation management section 630 that the movement of the storage racks and work in the work area such as packing is complete, the order management section 620 gives an instruction to move the storage racks storing the necessary items that were moved to the work area to another location, to the operation management section 630.

Figure 6B:
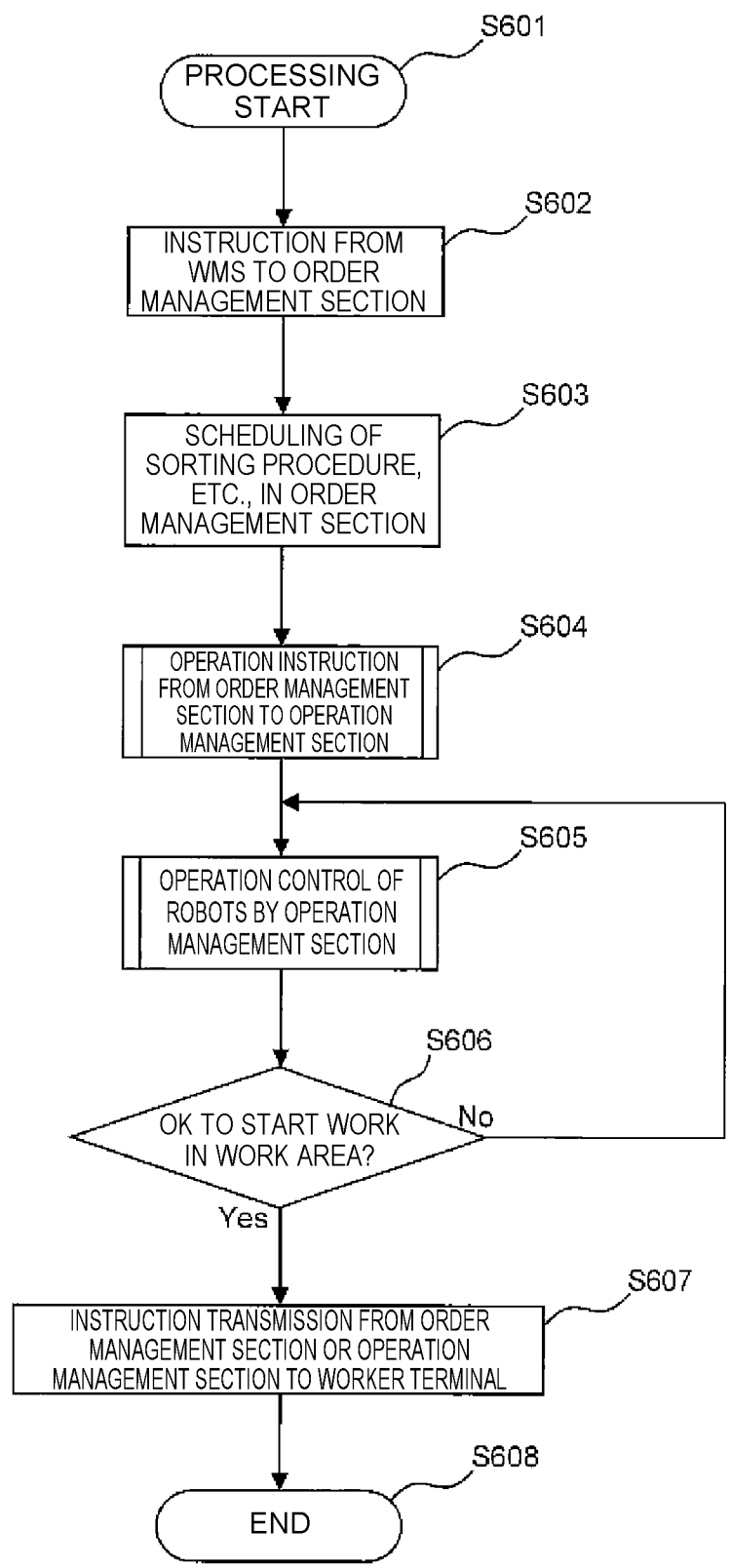
FIG. 6B is a flowchart illustrating a processing flow in a picking assistance system according to an embodiment of the present invention.

FIG. 6B illustrates a processing flow in a picking assistance system according to an embodiment of the present invention. In FIG. 6B, a flow of linked operation of the warehouse management system (WMS) 610, the order management section 620 and the operation management section 630 and a general flow of the operation management section 630 controlling automatic transport robots are illustrated.

When processing is started in step S601, the processing proceeds to step S602 and an instruction is given from the WMS 610 to the order management section. In an embodiment, this instruction includes order information and storage rack data.

In step S603, in the order management section, a schedule for sorting or packing items is created from the order information. In an embodiment, this schedule is created based on the order information and/or the storage rack data. More specifically, items to be sorted or packed to fulfill an order are extracted from the order information. The storage rack data provides (or communicates) which storage racks the items for the order are stored in, and lists the target storage racks that include the ordered items.

Here, if there are a plurality of listed storage racks that include necessary items for an order, storage racks close to each other may be selected or a combination of storage racks that makes a movement cost small may be selected. Alternatively, a part or an entirety of the selection processing may be performed in step S604.

In step S604, an instruction to operate the automatic transport robots is given from the order management section to the operation management section 630. In an embodiment, it is assumed that several to several tens or more of automatic transport robots are operated. Also, operation of the automatic transport robots includes transport of a storage rack picked up or selected in the preceding step to the work area.

In step S605, controlling automatic transport robots by the operation management section 630 is performed. The operation management section 630 recognizes respective current positions of the automatic transport robots in the facility, and in order to efficiently move a storage rack necessary for order processing to the work area, sequentially designates which of the robots to be slid into a lower portion of an assigned storage rack, and the operation management section provides instructions to the automatic transport robots for the sliding and transport of the designated storage racks to the work area. Storage rack transport for such purpose may be one-time transport of one storage rack or may be multiple-time transport of many storage racks. Determination of whether or not preparation necessary for the order processing has been completed is made in a next step.

In step S606, it is determined whether preparation such as the movement of storage racks necessary for order processing for an order has been completed so that sorting or packing in the work area can be started. If yes, (Yes in step S606), the processing proceeds to step S607, and if not (No), the processing returns to step S605 and the movement of necessary storage racks is continued. That is, instructions are given to the automatic transport robots by the control device to move the storage racks.

In step S607, an instruction for sorting or packing is transmitted from the order management section 620 (or the operation management section 630) to a worker terminal. In an embodiment, a worker can sort or pack necessary commodities or parts based on the instruction transmitted to the worker terminal.

Note that although in the above step, the worker is made to start work if it is determined in step S606 that preparation such as movement of storage racks necessary for the order processing has been completed so that sorting or packing in the work area can be started, the present invention is not limited to this example. For example, it is possible for the control device to give an instruction to start sorting or packing in the work area ahead without waiting for the movement of all of the storage racks necessary for the order to the work area to be completed.

Figure 6C:
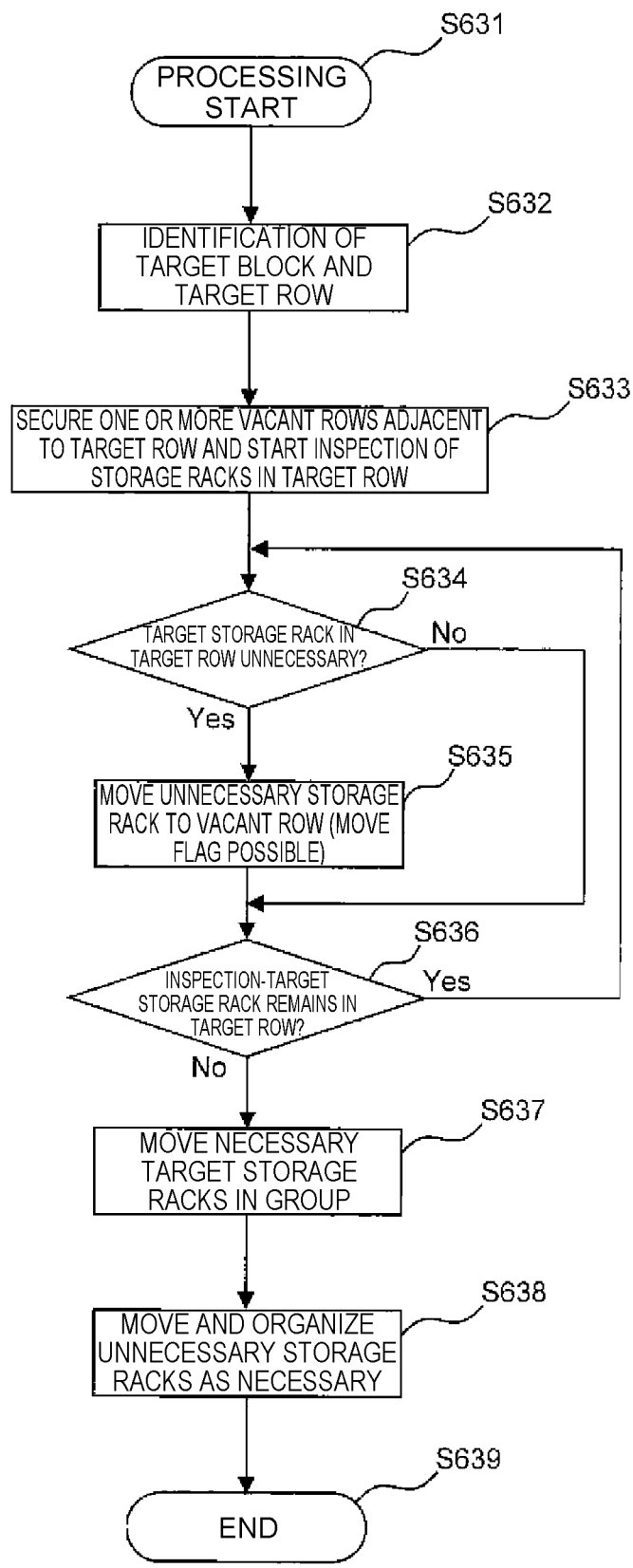
FIG. 6C is a flowchart illustrating a detailed processing flow in a picking assistance system according to an embodiment of the present invention.

FIG. 6C illustrates a detailed processing flow in a picking assistance system according to an embodiment of the present invention. The processing flow illustrated in FIG. 6C corresponds to a detailed flow of step S604 and/or step S605 in the processing flow illustrated in FIG. 6B.

Upon start of processing in the present flow in step S631, the processing proceeds to step S632, and a specific block and a row that includes an identified target storage rack to fulfill an order is selected. The first specific row of storage racks that is selected is typically a row at an edge of a block.

Next, the processing proceeds to step S633 to determine whether or not there are one or more vacant rows adjacent to the selected target row. If not, a vacant row is formed by moving storage racks in the target row to another location. However, if there are already one or more vacant rows adjacent to the target row, no storage racks are moved.

Then, an inspection of storage racks in the target row is started. In an embodiment, this inspection is an inspection for confirming whether or not commodities or parts that are currently necessary are stored in the storage racks. Also, in another embodiment, an additional inspection of the storage racks in the target row also determines whether or not the storage racks should be moved in a group, which will be described later.

Next, the processing proceeds to step S634 to determine whether or not a storage rack in the selected target row is unnecessary for the order processing. If Yes, the processing proceeds to step S635, and if No, the processing proceeds to step S636.

In step S635, processing for a storage rack determined as unnecessary for the order processing is performed. In an embodiment, an unnecessary storage rack is moved to one of the vacant rows. Alternatively, in another embodiment, the storage rack is not moved at this point in time and a flag may be set by the control device so that the storage rack is to be moved later.

Step S636 determines whether or not a target storage rack storing items necessary for an order still remains in the selected target row. If YES, the processing returns to step S634, and if NO, the processing proceeds to step S637.

In step S637, target storage racks determined as necessary for the order processing that remain in the target row and moved at one time or moved in a group. The one-time movement, or the movement in a group in the present invention is also called group movement.

The "movement in a group" or "group movement" mentioned here includes not only moving multiple storage racks at one time, but also includes moving multiple, aligned storage racks in a sequential manner. That is, group movement of storage racks also includes separately moving storage racks in order such that there is a time difference (for example, from around one to several seconds) between respective movement start times for each storage rack moved in the group.

Next, the processing proceeds to step S638 and the unnecessary storage racks that were moved to the vacant row adjacent to the target row are moved again for reorganization as necessary. After this, the processing proceeds to step S639 and the present flow ends.

FIGS. 7A to 10 sequentially illustrate movements of storage racks according to the steps described in FIGS. 6B and 6C.

Figure 7A:
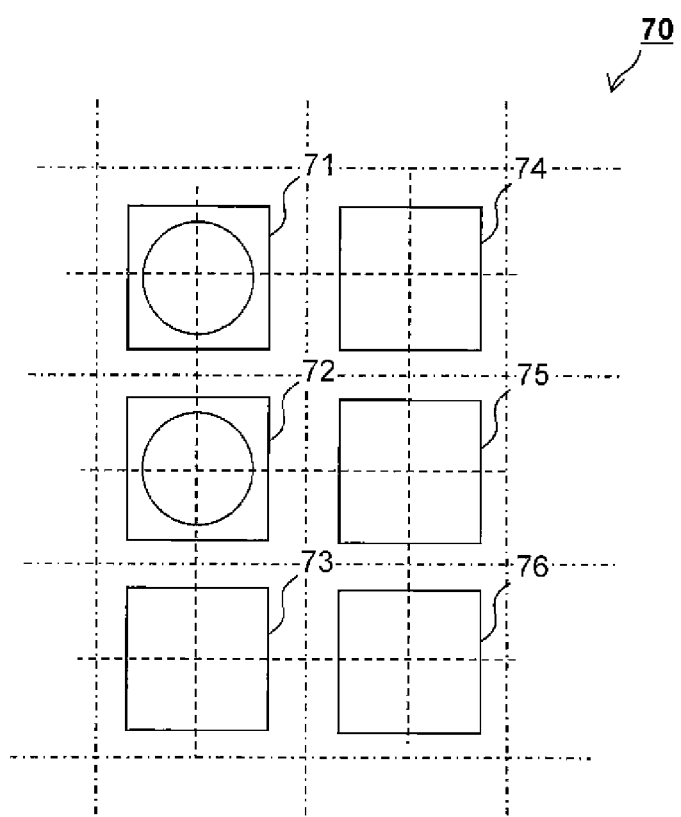
FIG. 7A is a diagram illustrating example storage rack movement control in a picking assistance system according to an embodiment of the present invention.

FIG. 7A illustrates an arrangement of storage of storage racks in a facility. In FIG. 7A, storage racks 71 to 76 are arranged in order in three longitudinal rows and two lateral rows. In FIG. 7A, each of respective areas where the storage racks 71 to 76 are arranged defines a "grid cell". The grid cell is the rectangular area surrounded by alternate long and short dash lines in the figure. Also, identification numbers and rack types of the storage racks 71 to 76, and/or types, counts and stored positions (e.g., a shelf number) of commodities or parts stored in each storage rack are managed by the management server 21. In another embodiment, the rack types can be managed by the warehouse management system 610 or the order management section 620.

Although in FIG. 7A, the storage racks 71 to 76 disposed in three longitudinal rows and two lateral rows configure one block, the present invention is not limited to this example and any number of longitudinal and lateral rows can configure one block.

Also, in FIG. 7A, a circle is drawn in the center of grid cells containing storage racks 71 and 72. The circle indicates that an automatic transport robot has slid into a lower portion of the rack to move the rack to another location. Each of the storage racks 71 and 72 is moved by a transport robot sliding into the lower portion of the storage rack and lifting the storage rack up.

In an embodiment of the present invention, a two-dimensional barcode or an IC tag is attached on a floor surface inside the facility at a center portion inside the grid cells (see the intersection part between dashed lines in FIG. 7A). When an automatic transport robot enters a lower portion of a rack, the robot can be configured to determine whether or not the robot has reached a correct position for picking up or delivering the storage rack by reading the barcode or IC tag on the floor surface.

Figure 7B:
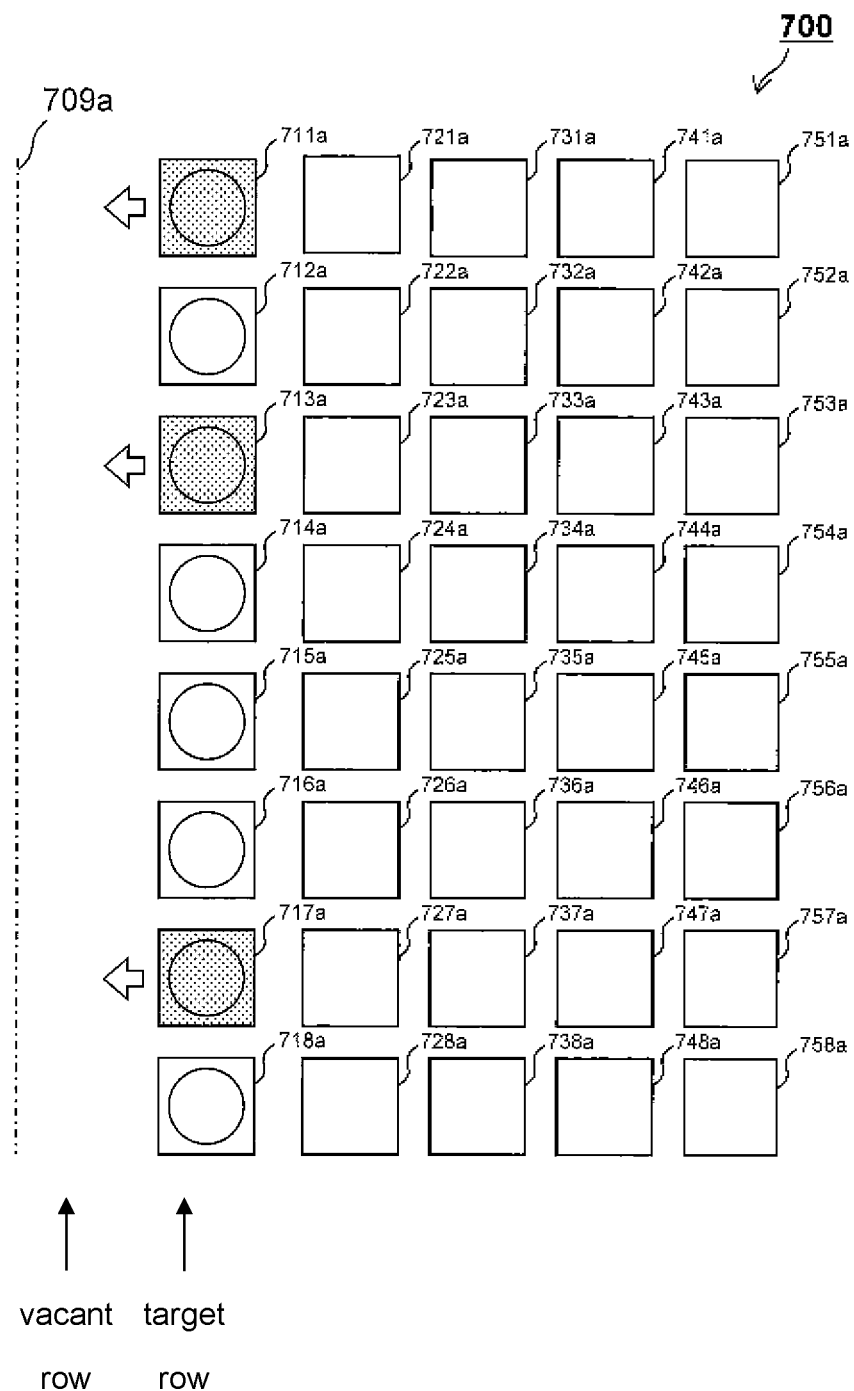
FIG. 7B is a diagram illustrating example storage rack movement control in a picking assistance system according to an embodiment of the present invention.

FIG. 7B indicates a state in which the flow in steps S632 to S636 (No in S636) has been executed. In other words, in FIG. 7B, in storage racks 711a to 718a forming a target row in a particular block 700, storage racks 711a, 713a and 717a that are currently unnecessary and storage racks 712a, 714a to 716a and 718a that are currently necessary are distinguished from each other. Note that an alternate long and short dash line 709a may be an actual wall in the facility or may be an invisible boundary in space. The alternate long and short dash line 709a enables confirmation of a vacant row adjacent to the storage racks 711a to 718a forming the current target row (row of grid cells in which no storage rack is disposed). Note that here, if no vacant row adjacent to the storage racks 711a to 718a forming the current target row is secured (if one or more storage racks remain), the storage rack (s) are moved in advance to secure a vacant row.

A characteristic point in FIG. 7B lies in that individual automatic transport robots have entered under all of boxes of the storage racks 711a to 718a forming the current target row. In another embodiment, one transport robot can move all three unnecessary storage racks 711a, 713a and 717a or alternatively, three transport robots c can each move one of the unnecessary storage racks 711a, 713a and 717a to evacuate the unnecessary storage racks 711a, 713a and 717a to the current vacant row. The manner of moving the unnecessary storage racks 711a, 713a and 717a is not limited. For time efficiency, it is preferable to use multiple transport robots to move unnecessary storage racks.

Figure 7C:
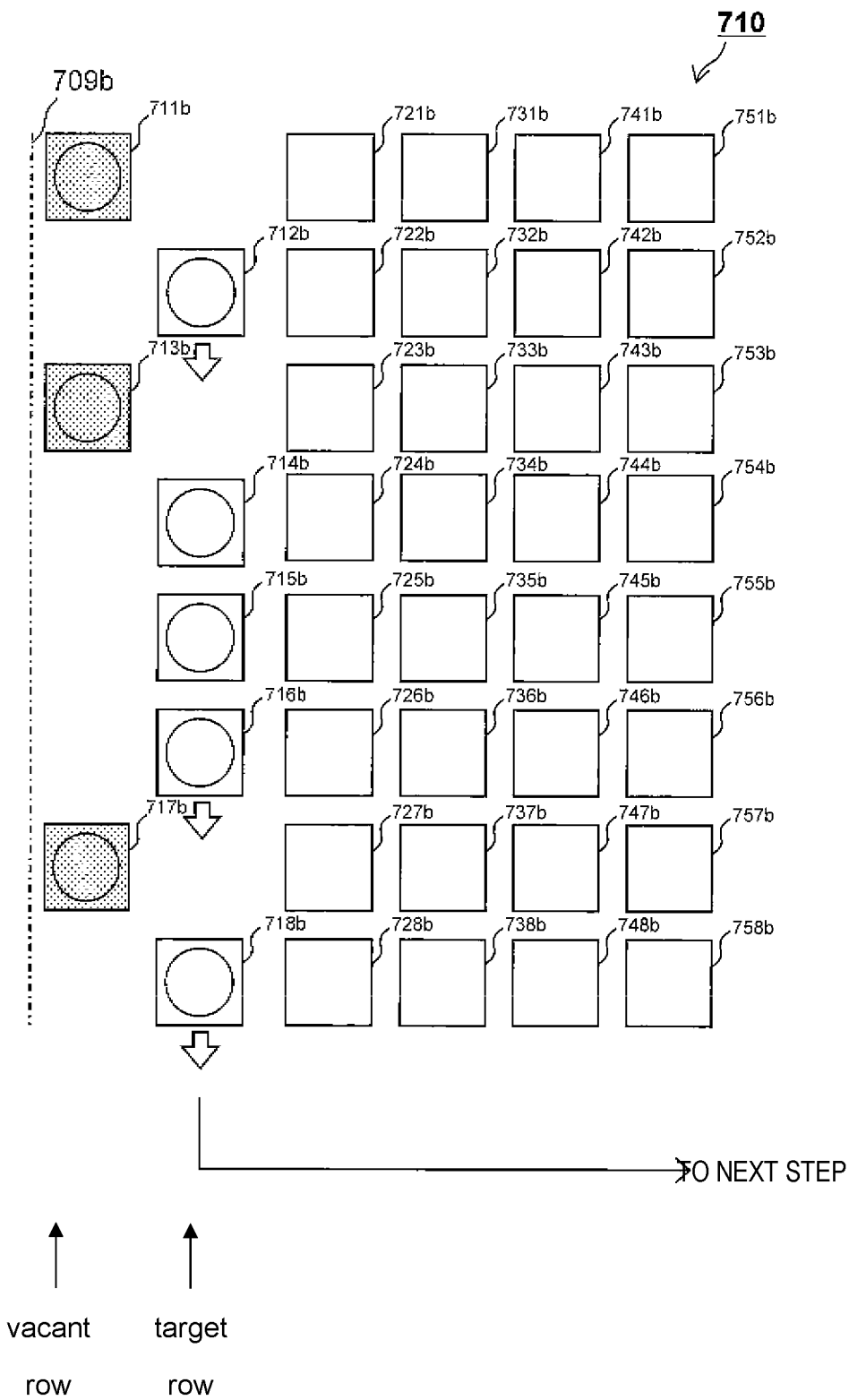
FIG. 7C is a diagram illustrating example storage rack movement control in a picking assistance system according to an embodiment of the present invention.

FIG. 7C illustrates an example control operation that comes next to FIG. 7B. In the block 710 in FIG. 7C, the storage racks 711b, 713b and 717b that are currently unnecessary have been evacuated to the current vacant row, and the storage racks 712b, 714b, 715b, 716b and 718b that are currently necessary are moved at one time or sequentially to another location (group movement). In an embodiment of the present invention, the other location is the work area; however, the present invention is not limited to this example. The movement to the other location can broadly be interpreted as movement to an area for a next step.

Note that storage racks 711a to 718a, 721a to 728a, 731a to 738a, 741a to 748a and 751a to 758a correspond to storage rack 711b to 718b, 721b to 728b, 731b to 738b, 741b to 748b and 751b to 758b, respectively. In the following, the index changes from a to f on a time-series basis.

Figure 8A:
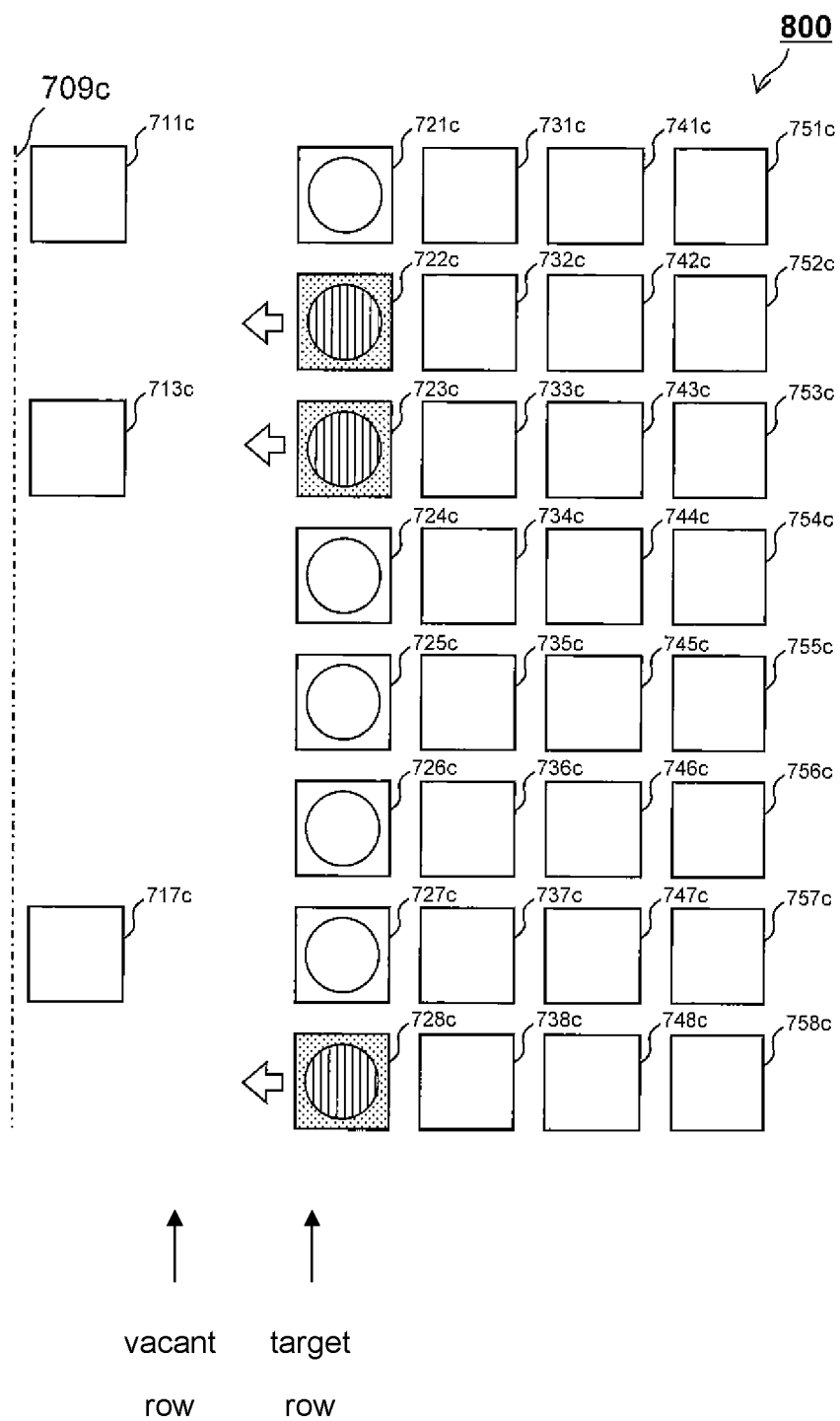
FIG. 8A is a diagram illustrating example storage rack movement control in a picking assistance system according to an embodiment of the present invention.

FIG. 8A illustrates an example control operation coming next to FIG. 7C. In a block 800 in FIG. 8A, the current target row has transitioned to 721c to 728c, and in that row, the storage racks 722c, 723c and 728c that are unnecessary are evacuated to the current vacant row that is adjacent to the current target row as shown in FIG. 8B.

Figure 8B:
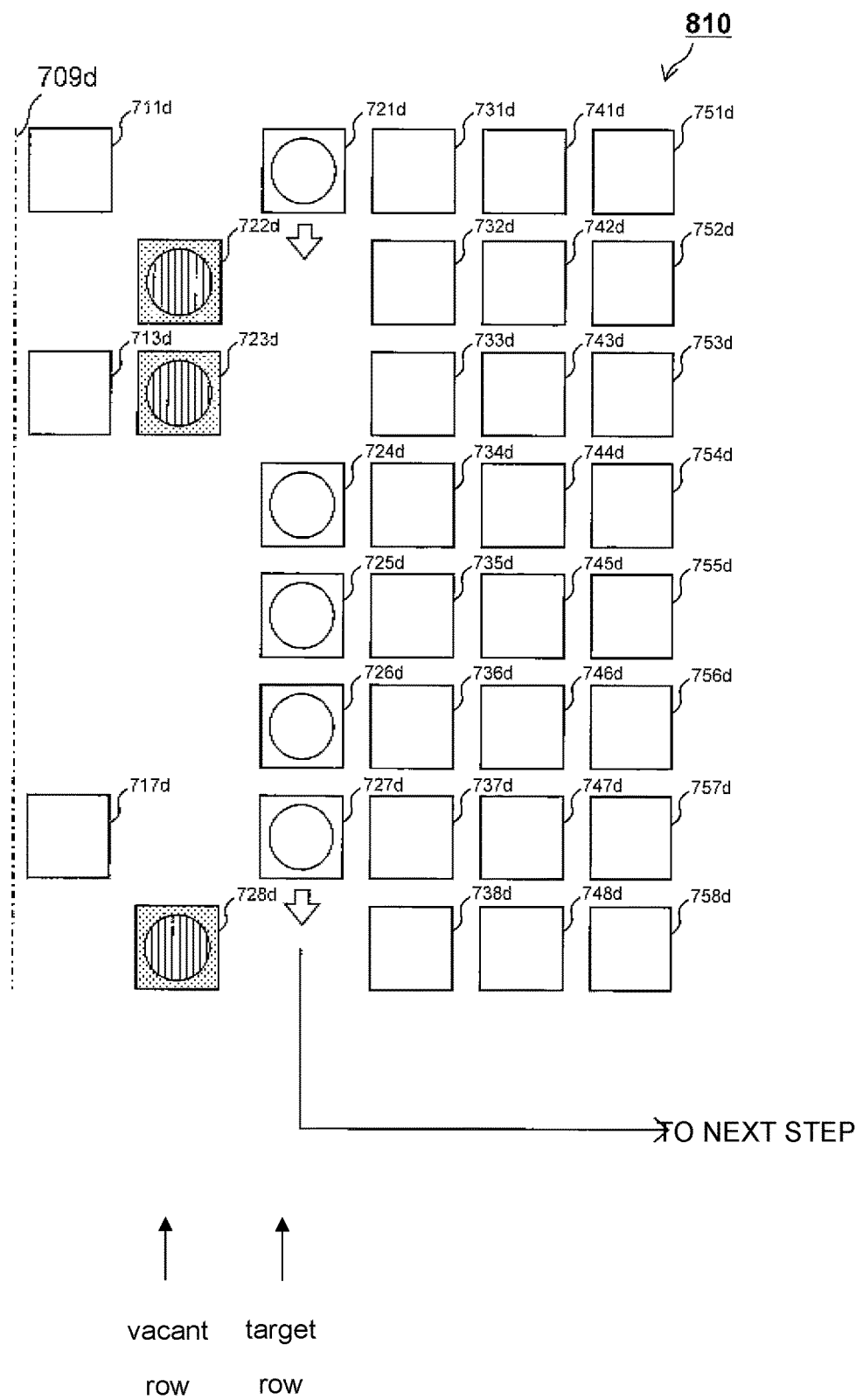
FIG. 8B is a diagram illustrating example storage rack movement control in a picking assistance system according to an embodiment of the present invention.

FIG. 8B illustrates an example control operation that occurs after the example control operation corresponding to step S638 as shown in FIG. 8A. In a block 810 in FIG. 8B, unnecessary storage racks 722d, 723d and 728d have already been evacuated to the adjacent vacant row. The storage racks 721c and 724c to 727c that are currently necessary are moved at one time or sequentially to another location (group movement).

Figure 9A:
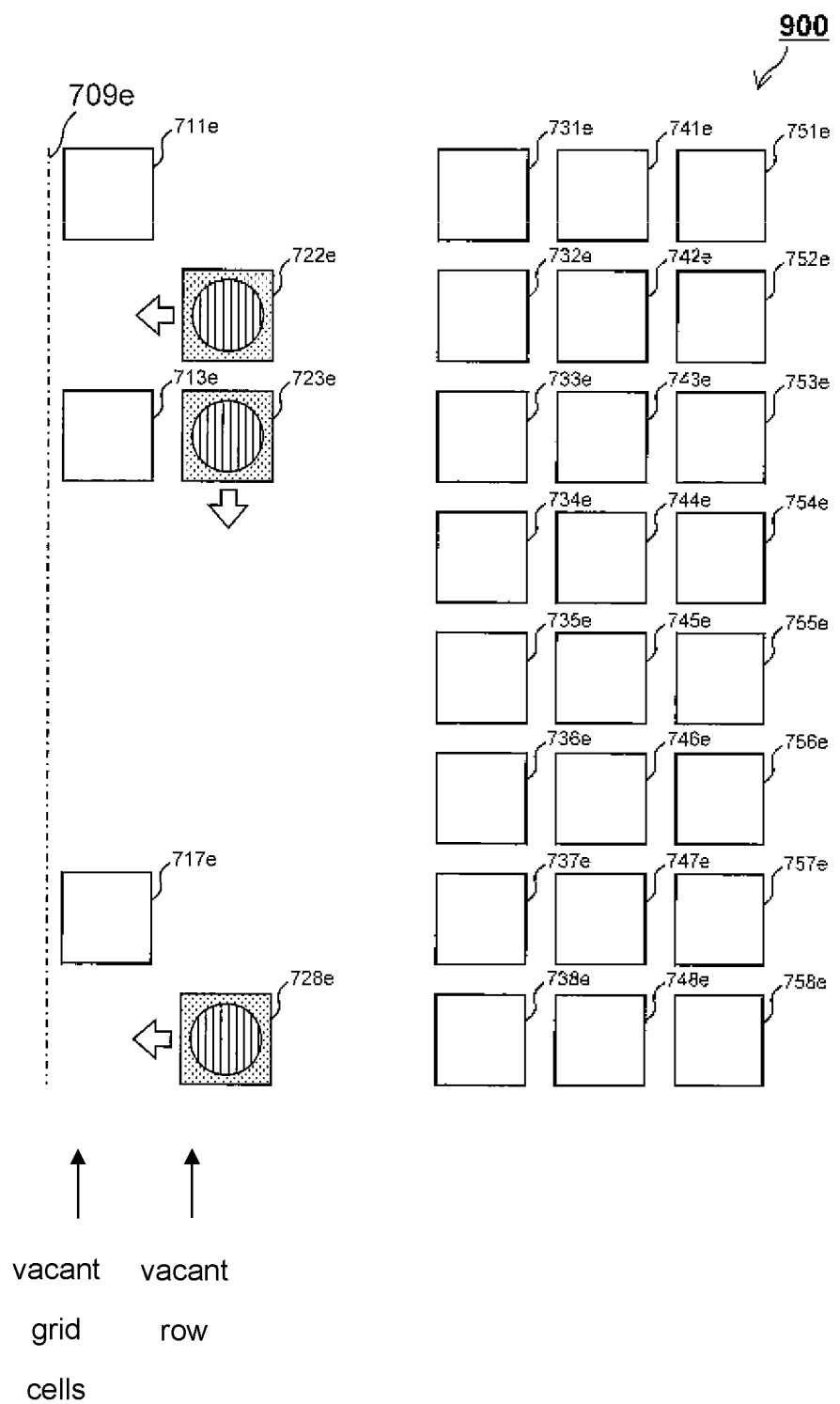
FIG. 9A is a diagram illustrating example storage rack movement control in a picking assistance system according to an embodiment of the present invention.

FIG. 9A illustrates an example control operation that occurs after the operation shown in FIG. 8B. In a block 900 in FIG. 9A, unnecessary storage racks 722e, 723e and 728e are moved to vacant grid cells in the row immediately adjacent to the row that unnecessary storage racks 722e, 723e and 728e are presently located. This row that the unnecessary storage racks 722e, 723e and 728e are moved to is the row that presently includes storage racks 711e, 713a, and 717e that were moved previously. The storage racks 722e, 723e, and 728e are organized in vacant grid cells of the row already comprising storage racks 711e, 713e, and 717e.

Figure 9B:
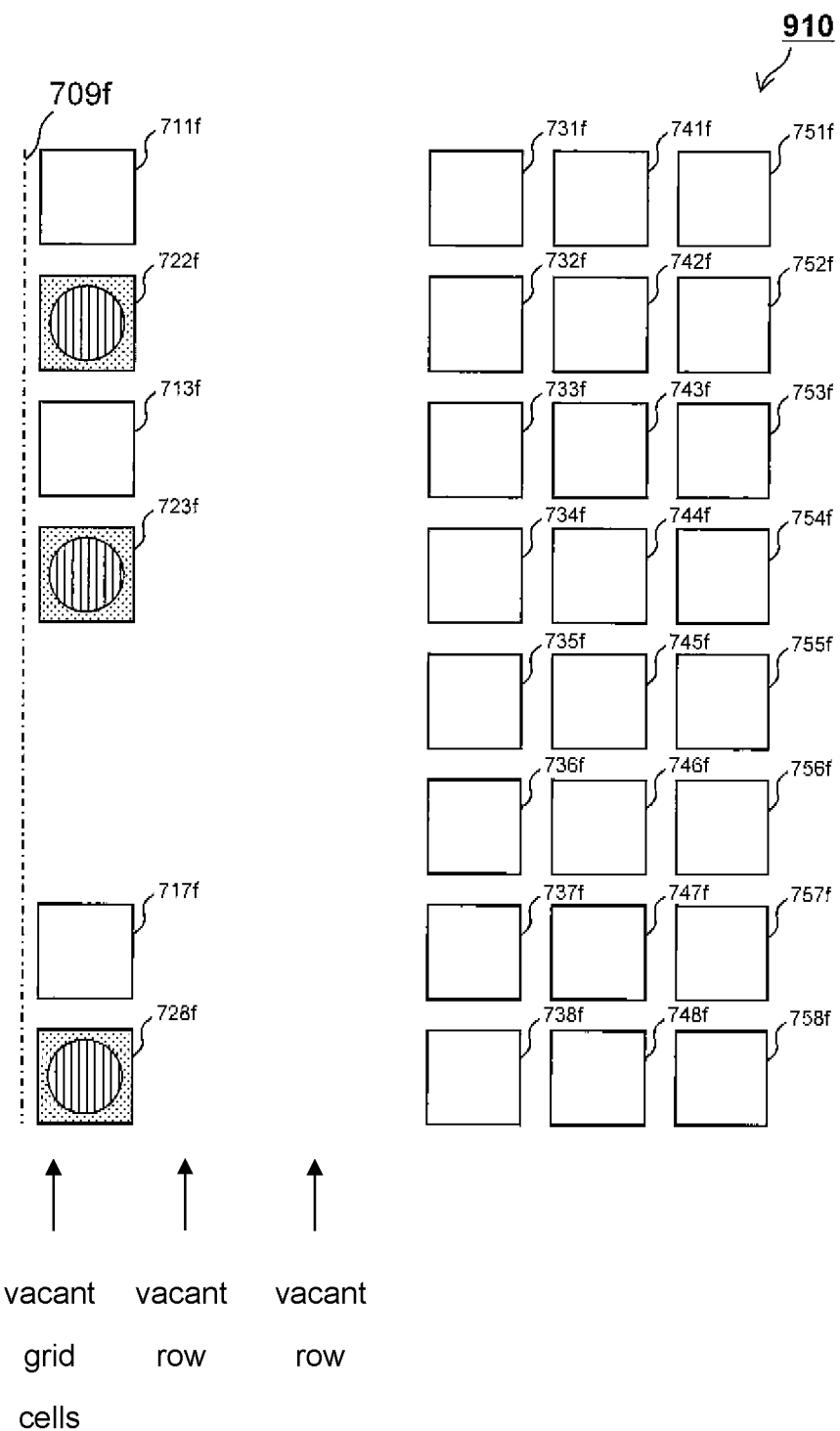
FIG. 9B is a diagram illustrating example storage rack movement control in a picking assistance system according to an embodiment of the present invention.

FIG. 9B illustrates an example control operation that occurs after the example shown in FIG. 9A. In a block 910 in FIG. 9B, storage racks 722e, 723e and 728e that are currently unnecessary are moved to vacant grid cells in a left edge row in FIG. 9B and organized. The left edge row now includes storage racks 711f, 722f, 713f, 723f, 717f and 728f. Also, as illustrated in FIG. 9B, two vacant rows have been generated at this point of time. The control operations up to this point may be repeated in the remaining rows comprising 731f to 738f, 741f to 748f and 751f to 758f to increase the number of vacant rows may be repeated such that particularly storage racks located in a present target row are moved to a designated, adjacent vacant row at an appropriate timing in the same manner mentioned above.

Figure 10:
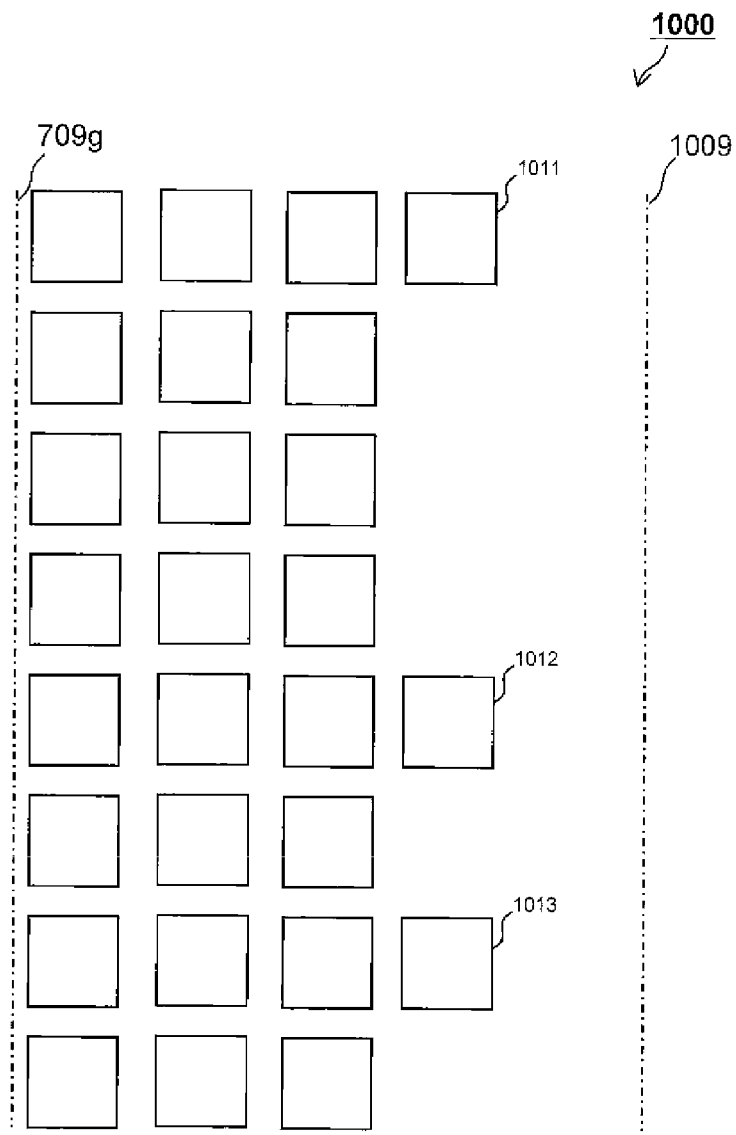
FIG. 10 is a diagram illustrating example storage rack movement control in a picking assistance system according to an embodiment of the present invention.

FIG. 10 illustrates an example disposition of storage racks after repetition of the above-described control operations. In a block 1000 in the figure, as a whole, the storage racks are brought close to a boundary 709g in the facility (which may be an actual wall or an invisible boundary in space) and at a right edge of the block, storage racks 1011, 1012 and 1013 are disposed as remaining storage racks not forming a row.

In an embodiment of the present invention, this time, efficient group movement of storage racks can be continued by control operations symmetrical to those illustrated in FIG. 7B onwards being repeated for a boundary 1009 on the right side of the block 1000 (which may be an actual wall or an invisible boundary in space).

Variations of Present Invention

In an embodiment of the present invention, for example, in steps S634 to S636, unnecessary storage racks in a target row are moved to a vacant row and necessary storage racks remained in the target row are moved in a group to another location. The present invention is not limited to this example.

In this case, the operations in FIGS. 7B to 10 may be replaced by a mode in which unnecessary storage racks in a target row are moved to a vacant row and currently necessary storage racks remained in the target row are moved in a group to another location.

Although embodiments of the picking assistance system have been described based on specific examples, embodiments of the present invention may take a form of a storage medium with a program recorded (examples of the medium include an optical disk, a magnetooptical disk, a CD-ROM, a CD-R, a CD-RW, a magnetic tape, a hard disk and a memory card) in addition to a system, or a method or a program for implementing a device.

Also, a form of implementation of a program is not limited to application programs such as object code complied by a complier and program code executed by an interpreter but may be a form such as a program module incorporated in an operating system.

Furthermore, a program does not necessarily require all of processes to be performed only in a CPU on a control board but can be configured in such a manner as to allow some or all of processes to be performed by another processing unit (a DSP) mounted on an extension board or an extension unit added to the board as necessary.

Any combinations from all of elements described in, and/or all of steps in all of methods or processes disclosed in, the present description (including the claims, the abstract and the drawings) are possible except that such combinations are ones in which the relevant features are exclusive from each other.

Also, unless explicitly denied, each of the features described in the present description (including the claims, the abstract and the drawings) can be replaced with an alternative feature that serves for a same purpose, an equivalent purpose or a similar purpose. Therefore, unless explicitly denied, each of the disclosed features is a mere example in a comprehensive set of same or equivalent features.

Furthermore, the present invention is not limited to any of the specific configurations of the above-described embodiments. The present invention can be extended to all of novel features described in the present description (including the claims, the abstract and the drawings) or combinations thereof or all of steps in novel methods or processing described in the present description or combinations thereof.

REFERENCE SIGNS LIST 10 logistics facility (plant facility)
20 picking assistance system
21 management server
22 to 23 automatic transport robot
24 PC (one form of worker terminal)
25 tablet terminal (one form of worker terminal)
26 to 28 storage rack
37, 38 communication channel
39 public channel (dedicated channel, the Internet, etc.)

The invention claimed is:

1. A picking assistance system to assist picking from one or more storage racks storing one or more items necessary to fulfill an order, the system comprising:
    a plurality of storage racks disposed in rows in the longitudinal and lateral directions in a storage area, wherein one or more storage racks that store the one or more necessary items are moved from among a plurality of storage racks in the storage area to another location; and
    a control device configured to:
    instruct a movement of the storage racks in the storage area such that one or more vacant rows is formed in the longitudinal or lateral direction,
    select a target row that is parallel and adjacent to a vacant row of the one or more vacant rows in the storage area, wherein, in the target row, one or more storage racks that are not storing the one or more necessary items are moved to the vacant row that is adjacent to the selected target row, and the one or more storage racks storing the one or more necessary items remain in the target row, and instruct each of the one or more storage racks storing the one or more necessary items that have remained in the target row to be moved in one group to the other location.

2. The system according to claim 1, wherein after the storage racks in the selected target row that are not storing the one or more necessary items have been moved to the adjacent vacant row that is next to the selected target row, and the one or more storage racks that are storing the one or more necessary items have been moved from a target row to the other location;

the number of storage racks that are not storing the one or more necessary items that were moved to the adjacent vacant row is less than a total number of storage racks in a new target row to be selected that is parallel and adjacent to the adjacent vacant row.

3. The system according to claim 1, wherein after the one or more storage racks storing necessary items in a selected target row are moved in the one group from the storage area to the other location, the control device further instructs the storage racks that are not storing necessary items to be moved to a new adjacent vacant row;

wherein for each of the storage racks that are not storing necessary items that were moved to the new adjacent vacant row, the storage racks located in the new adjacent vacant row that are not storing the one or more necessary items are further moved from the adjacent vacant row to a vacant space in the row parallel to and neighboring the adjacent vacant row, wherein the row neighboring the adjacent vacant row that includes the vacant space also includes previously moved storage racks that are not storing necessary items from a previously selected target row.

4. The system according to claim 1, wherein the other location is a work area.

5. A picking assistance system to assist picking from one or more storage racks storing one or more items necessary to fulfill an order, the system comprising:

a plurality of storage racks disposed in rows in the longitudinal and lateral directions in a storage area, wherein one or more storage racks that store the one or more necessary items are moved from among a plurality of storage racks in the storage area to another location; and a control device configured to:

instruct a movement of the storage racks in the storage area such that one or more vacant rows is formed in the longitudinal or lateral direction;

select a target row that is parallel and adjacent to a vacant row of the one or more vacant rows in the storage area, wherein, in the target row, one or more storage racks that are storing the one or more necessary items are moved to the vacant row that is adjacent to the selected target row, and the one or more storage racks not storing the one or more necessary items remain in the target row; and instruct each of the one or more storage racks storing the one or more necessary items that have been moved to the vacant row to be moved in one group to the other location.

6. The system according to claim 5, wherein after the storage racks in the selected target row that are not storing the one or more necessary items have been moved to the adjacent vacant row that is next to the selected target row, and the one or more storage racks that are storing the one or more necessary items have been moved from a target row to the other location;

the number of storage racks that are not storing the one or more necessary items that were moved to the adjacent vacant row is less than a total number of storage racks in a new target row to be selected that is parallel and adjacent to the adjacent vacant row.

7. The system according to claim 5, wherein after the one or more storage racks storing necessary items in a selected target row are moved in the one group from the storage area to the other location, the control device further instructs the storage racks that are not storing necessary items to be moved to a new adjacent vacant row;

wherein for each of the storage racks that are not storing necessary items that were moved to the new adjacent vacant row, the storage racks located in the new adjacent vacant row that are not storing the one or more necessary items are further moved from the adjacent vacant row to a vacant space in the row parallel to and neighboring the adjacent vacant row, wherein the row neighboring the adjacent vacant row that includes the vacant space also includes previously moved storage racks that are not storing necessary items from a previously selected target row.

8. The system according to claim 5, wherein the other location is a work area.

9. A program that operates on a picking assistance system to assist picking from one or more storage racks storing one or more items necessary to fulfill an order, the system comprising:

a plurality of storage racks disposed in rows in the longitudinal and lateral directions in a storage area, wherein one or more storage racks that store the one or more necessary items are moved from among a plurality of storage racks in the storage area to another location; and a control device configured to:

instruct a movement of the storage racks in the storage area such that one or more vacant rows is formed in the longitudinal or lateral direction;

select a target row that is parallel and adjacent to a vacant row of the one or more vacant rows in the storage area, wherein, in the target row, one or more storage racks that are not storing the one or more necessary items are moved to the vacant row that is adjacent to the selected target row, and the one or more storage racks storing the one or more necessary items remain in the target row; and instruct each of the one or more storage racks storing the one or more necessary items that have remained in the target row to be moved in one group to the other location.

10. The program according to claim 9, wherein after the storage racks in the selected target row that are not storing the one or more necessary items have been moved to the adjacent vacant row that is next to the selected target row, and the one or more storage racks that are storing the one or more necessary items have been moved from a target row to the other location;

the number of storage racks that are not storing the one or more necessary items that were moved to the adjacent vacant row is less than a total number of storage racks in a new target row to be selected that is parallel and adjacent to the adjacent vacant row.

11. The program according to claim 9, wherein
after the one or more storage racks storing necessary items in a selected target row are moved in the one group from the storage area to the other location, the control device further instructs the storage racks that are not storing necessary items to be moved to a new adjacent vacant row;
wherein for each of the storage racks that are not storing necessary items that were moved to the new adjacent vacant row, the storage racks located in the new adjacent vacant row that are not storing the one or more necessary items are further moved from the adjacent vacant row to a vacant space in the row parallel to and neighboring the adjacent vacant row,
wherein the row neighboring the adjacent vacant row that includes the vacant space also includes previously moved storage racks that are not storing necessary items from a previously selected target row.

12. A program that operates on a picking assistance system to assist picking from one or more storage racks storing one or more items necessary to fulfill an order, the system comprising:
a plurality of storage racks disposed in rows in the longitudinal and lateral directions in a storage area, wherein one or more storage racks that store the one or more necessary items are moved from among a plurality of storage racks in the storage area to another location; and
a control device configured to:
instruct a movement of the storage racks in the storage area such that one or more vacant rows is formed in the longitudinal or lateral direction;
select a target row that is parallel and adjacent to a vacant row of the one or more vacant rows in the storage area, wherein, in the target row, one or more storage racks that are storing the one or more necessary items are moved to the vacant row that is adjacent to the selected target row, and the one or more storage racks not storing the one or more necessary items remain in the target row; and
instruct each of the one or more storage racks storing the one or more necessary items that have been moved to the vacant row to be moved in one group to the other location.

13. The program according to claim 12, wherein
after the storage racks in the selected target row that are not storing the one or more necessary items have been moved to the adjacent vacant row that is next to the selected target row, and the one or more storage racks that are storing the one or more necessary items have been moved from a target row to the other location;
the number of storage racks that are not storing the one or more necessary items that were moved to the adjacent vacant row is less than a total number of storage racks in a new target row to be selected that is parallel and adjacent to the adjacent vacant row.

14. The program according to claim 12, wherein
after the one or more storage racks storing necessary items in a selected target row are moved in the one group from the storage area to the other location, the control device further instructs the storage racks that are not storing necessary items to be moved to a new adjacent vacant row;
wherein for each of the storage racks that are not storing necessary items that were moved to the new adjacent vacant row, the storage racks located in the new adjacent vacant row that are not storing the one or more necessary items are further moved from the adjacent vacant row to a vacant space in the row parallel to and neighboring the adjacent vacant row,
wherein the row neighboring the adjacent vacant row that includes the vacant space also includes previously moved storage racks that are not storing necessary items from a previously selected target row.

15. A picking assistance system for picking items that are necessary to fulfill an order, the system comprising:
a plurality of rows of storage racks are formed in the longitudinal or lateral direction;
a control device configured to:
instruct storage racks to be moved in the storage area such that one or more vacant rows of the plurality of rows of storage racks is formed,
select a target row that is adjacent to one of the vacant rows in the storage area, in the target row, storage racks that are not storing any necessary items are moved to the adjacent vacant row, and the storage racks storing at least one necessary item remain in the target row, and
instruct the storage racks storing the necessary items remaining in the target row to be moved in one group to the other location.

16. A picking assistance system for picking items that are necessary to fulfill an order, the system comprising:
a plurality of rows of storage racks are formed in the longitudinal or lateral direction;
a control device configured to:
instruct storage racks to be moved in the storage area such that one or more vacant rows of the plurality of rows of storage racks is formed,
select a target row that is adjacent to one of the vacant rows in the storage area, in the target row, storage racks that are storing at least necessary item are moved to the adjacent vacant row, and the storage racks that are not storing any necessary items remain in the target row, and
instruct the storage racks that are not storing any necessary items remaining in the target row to be moved in one group to the other location.

* * * * *